Aug. 12, 1924.
H. K. SANDELL
PRIMARY BATTERY
Filed Feb. 15, 1923
1,504,788
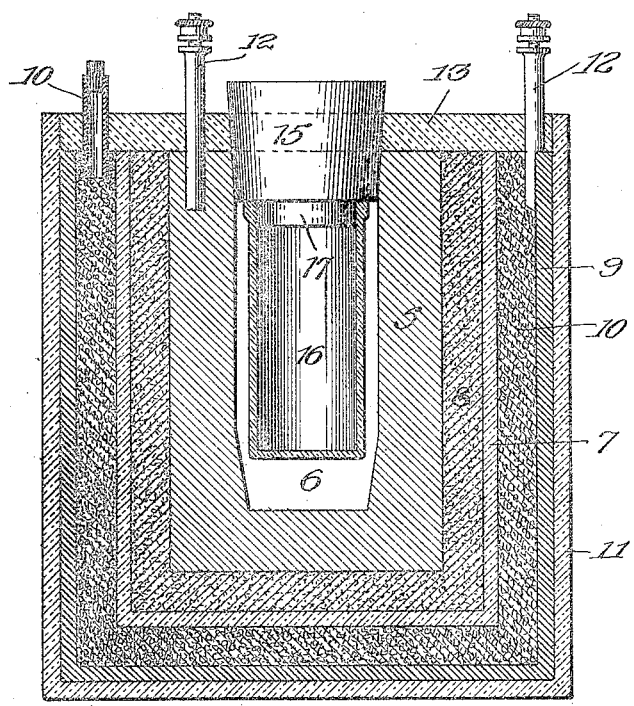
Inventor:
Henry K. Sandell, Patented Aug. 12, 1924.

1,504,788

UNITED STATES PATENT OFFICE.

HENRY K. SANDELL, OF CHICAGO, ILLINOIS.

PRIMARY BATTERY.

Application filed February 15, 1923. Serial No. 619,143.

*To all whom it may concern:*

Be it known that I, HENRY K. SANDELL, a citizen of the United States, residing at Chicago, in the county of Cook and State of Illinois, have invented a new and useful Improvement in Primary Batteries, of which the following is a specification.

This invention relates to improvements in primary batteries and more particularly to the type of primary battery in which two electrolytes are employed.

In the battery of the present invention, a form of construction has been provided which permits of obtaining relatively high voltage currents, and which has as one of its advantages the provision of a type of battery in which the advantages of the two solution cell may be obtained while being adapted for the ordinary uses in which dry cells are employed.

The advantageous features of the construction will more fully appear from the following description, illustrated by the accompanying drawing in which a battery constructed in accordance with the present invention is shown in vertical section.

Referring more particularly to the drawings, the numeral 5 indicates an anode of porous material, preferably a partially graphitized carbon. This anode is, in the form illustrated, cylindrical in shape and provided with a central substantially cylindrical chamber 6. Completely surrounding the porous anode 5 at the sides and bottom is a cylindrical fibre body or separator 7 of sufficient permeability to permit ionic diffusion. The space between the fibre separator 7 and the porous anode 5 is completely filled with pulverized carbon, indicated by the numeral 8. Surrounding the fibre separator 7 is a container 9 of zinc, iron or other suitable cathode material, the space between this cathode and the separator being filled with a suitable inert absorbent material 10, such as sawdust, wood fibre, starch paste or other like material. This cathode may serve as a container, for the cell as well as the cathode. It is preferably protected by an external cover 11, which may suitably be a waterproof paper or fabric, a suitable waterproofing material being wax or asphalt. Terminals 12, are secured to the anode 5, and the cathode 9. The cell is protected by a covering 13, of a suitable dielectric material, such as pitch or asphalt. A stoppered tube 14, passing through this covering 13, is provided for the supply of electrolyte to the body of absorbent material 10, and a suitable opening provided with a stopper 15, permits the supply of electrolyte to the cavity 6 in the porous anode 5. Any suitable electrolytes may be employed. For example, a solution of sodium chloride in the proportions of one-half pound sodium chloride per gallon of water may be used as the electrolyte for the saturation of the absorbent material in the chamber 10 between the separator 7 and the cathode 9, and a solution of sulphuric acid and potassium dichromate or sodium nitrate may be employed within the porous anode, for example, in proportions of one part sulphuric acid and one-half part bichromate or nitrate to 12 parts water (by weight).

In the form of construction illustrated, means are shown for supplying a renewal charge of anode electrolyte with the cell. A cylindrical container 16, somewhat smaller than the cavity 6 in the anode, is secured to the stopper 15 by being forced upon a projecting reduced cylindrical portion 17 of the latter. The stopper 15 thus serves as a closure for the container 16 as well as for the cavity 6. When the electrolyte originally supplied to the anode is exhausted, the stopper 15 may be removed and the container 16 emptied into the cavity 6, the container 16 being originally supplied with a charge of the anode electrolyte.

In the operation of the battery, the anode electrolyte saturates the porus anode and the layer of pulverized anode material surrounding it. Any excess of this electrolyte remaining in the cavity 6 gradually diffuses through the anode as required. It is readily apparent that any suitable depolarizing agent may be employed in connection with this battery and that the specific materials employed for the anode and cathode and for the electrolytes may be varied, as is well known in the art.

Although the present invention has been described in connection with the specific details of the instructions embodying it, it is not intended that these details shall be regarded as limitations upon the scope excepting so far as included in the accompanying claims.

I claim:

1. In a primary battery, a porous anode body, a cathode surrounding said anode body, a separator between the cathode and anode body, means for supplying an electrolyte between the separator and the cathode and means for supplying an electrolyte within the anode body.

2. In a primary battery, a porous anode body, a cathode on the exterior of said anode body, a separator between the cathode and the anode, pulverized anode material interposed between the anode and the separator, means for supplying an electrolyte between the separator and the cathode and means for supplying an electrolyte within the anode body.

3. In a primary battery, a porous anode body having a central electrolyte chamber therein, a stopper for said chamber, said stopper having a reduced portion extending into the chamber, a reserve electrolyte container supported within the anode chamber and closed by the reduced stopper portion, said container being spaced from the interior of the anode chamber at the sides and bottom, and an electrolyte within the chamber and surrounding the container.

4. In a primary battery, a porous anode body having a central electrolyte chamber therein, a cathode on the exterior of said anode body, a separator between the cathode and the anode, pulverized anode material interposed between the anode and the separator, an acid electrolyte containing an oxidizing reagent within the chamber in the anode body and permeating said anode body and porous anode material, and a saline electrolyte between the cathode and the separator.

HENRY K. SANDELL.